(12) United States Patent
Zhao et al.

(10) Patent No.: US 8,738,946 B2
(45) Date of Patent: May 27, 2014

(54) METHOD FOR AN OS TO DISABLE A GRAPHICS ADAPTER AND LOCK INPUTS WHEN TABLET DISPLAY IS DETACHED ON A HYBRID LAPTOP

(75) Inventors: Qian Zhao, Beijing (CN); Bin Li, Beijing (CN); Tao Jing, Beijing (CN)

(73) Assignees: Lenovo (Beijing) Limited, Beijing (CN); Beijing Lenovo Software Ltd., Beijing (CN)

( * ) Notice: Subject to any disclaimer, the term of this patent is extended or adjusted under 35 U.S.C. 154(b) by 151 days.

(21) Appl. No.: 13/259,838

(22) PCT Filed: Dec. 29, 2010

(86) PCT No.: PCT/CN2010/002195
§ 371 (c)(1),
(2), (4) Date: Sep. 23, 2011

(87) PCT Pub. No.: WO2011/079523
PCT Pub. Date: Jul. 7, 2011

(65) Prior Publication Data
US 2012/0221870 A1  Aug. 30, 2012

(30) Foreign Application Priority Data
Dec. 31, 2009  (CN) .......................... 2009 1 0244448

(51) Int. Cl.
*G06F 1/26* (2006.01)
*G06F 1/16* (2006.01)
*G06F 1/32* (2006.01)
*G06F 21/84* (2013.01)

(52) U.S. Cl.
CPC ............ *G06F 1/1654* (2013.01); *G06F 1/3218* (2013.01); *G06F 1/3265* (2013.01); *G06F 21/84* (2013.01)
USPC ........................................................ 713/320

(58) Field of Classification Search
CPC ... G06F 1/1654; G06F 1/3218; G06F 1/3265; G06F 21/82; G06F 21/84; G06F 15/0225

USPC ......................................................... 713/320
See application file for complete search history.

(56) References Cited

U.S. PATENT DOCUMENTS

| 4,922,448 | A | * | 5/1990 | Kunieda et al. ................ 713/320 |
| 6,049,832 | A | * | 4/2000 | Brim et al. .................... 709/237 |

(Continued)

FOREIGN PATENT DOCUMENTS

| CN | 2497364 | 7/2001 |
| CN | 2497364 Y | 6/2002 |

(Continued)

OTHER PUBLICATIONS

International Search Report for PCT/CN2010/002195, date of mailing of the international search report Mar. 31, 2011, 2 pages.

*Primary Examiner* — Thomas Lee
*Assistant Examiner* — Danny Chan
(74) *Attorney, Agent, or Firm* — Westman, Champlin & Koehler, P.A.

(57) ABSTRACT

A computer and a method for controlling an operating state of a device thereof are disclosed. The method comprises: detecting that a display portion and a host portion of the computer are in a state of being disconnected from each other; and generating a state event or a control instruction corresponding to the disconnected state for switching the device to an inactive state. With the present invention, when the state of a computer changes, e.g., when a display portion and a host portion of a portable computer are separated, an operating system can control a device to switch its operating state, e.g., deactivate the device, based on a generated state event. In this way, it is possible to avoid unnecessary power consumption of the entire computer due to the active state of the device, and any potential security risk can be eliminated.

11 Claims, 7 Drawing Sheets

(56) References Cited

U.S. PATENT DOCUMENTS

| | | |
|---|---|---|
| 6,473,789 B1 * | 10/2002 | Chen et al. .................... 709/213 |
| 2002/0109665 A1 * | 8/2002 | Matthews et al. ............. 345/156 |
| 2003/0112585 A1 * | 6/2003 | Silvester ....................... 361/679 |
| 2003/0112588 A1 * | 6/2003 | Shimano ....................... 361/683 |
| 2004/0268168 A1 * | 12/2004 | Stanley et al. ................ 713/320 |
| 2006/0119603 A1 * | 6/2006 | Chen et al. .................... 345/502 |
| 2006/0152517 A1 * | 7/2006 | Paquette et al. ............... 345/543 |
| 2010/0306564 A1 * | 12/2010 | Kojo ............................. 713/323 |
| 2012/0166679 A1 * | 6/2012 | Zawacki et al. ................... 710/8 |

FOREIGN PATENT DOCUMENTS

| CN | 1564112 A | 1/2005 |
|---|---|---|
| CN | 1949165 A | 4/2007 |
| CN | 100424616 C | 10/2008 |
| CN | 101609360 A | 12/2009 |

* cited by examiner

METHOD FOR AN OS TO DISABLE A GRAPHICS ADAPTER AND LOCK INPUTS WHEN TABLET DISPLAY IS DETACHED ON A HYBRID LAPTOP

CROSS-REFERENCE TO RELATED APPLICATION

This Application is a Section 371 National Stage Application of International Application No. PCT/CN2010/002195, filed 29 Dec. 2010 and published as WO 2011/079523 on 7 Jul. 2011, not in English, and this application also claims priority to Chinese Patent Application No. 200910244448.7, filed 31 Dec. 2009, the contents of which are hereby incorporated by reference in their entirety.

TECHNICAL FIELD

The invention relates to computer technology, and more particularly, to a computer and a method for controlling operating state of a device thereof.

BACKGROUND

With the development of computer technology, a computer, which includes a display portion (i.e., screen portion) and a host detachable from each other, has been developed. For example, in some models of portable computers, the display portion is composed of an embedded system and a liquid crystal display screen, while the host portion operates based on an X86 system. The detached display portion can function as a tablet computer alone or as a complete portable computer in combination with the host portion.

There are at least the following problems with the prior art. In a portable computer, and many other situations as well, some devices or units of the host portion need not always be in an active and power-consuming state. Furthermore, in some particular situations, there may be a security risk if the devices or units of the host portion are always in the active state.

SUMMARY

The object of the present invention is to provide a computer and a method for controlling operating state of a device thereof, capable of controlling a device or unit of the computer to enter an inactive state in a predetermined condition.

A method for controlling operating state of a device of a computer is provided, which comprises:
  detecting that a display portion and a host portion of the computer are in a state of being disconnected from each other; and
  generating a state event or a control instruction corresponding to the disconnected state, said state event or control instruction is configured for switching the device into an inactive state.

In the above method, the device is a graphic adapter or an input device.

In the above method, when the display portion and the host portion of the computer are disconnected from each other, the switched-into operating state is an inactive state in case of the graphic adapter, or the switched-into operating state is an input locked state in case of the input device. When the display portion and the host portion of the computer are connected with each other, the switched-into operating state into is an active state in case of the graphic adapter, or the switched-into operating state is an input unlocked state in case of the input device.

In the above method, the state event or control instruction is generated by an embedded controller within the computer.

In the above method, the step of generating a state event or a control instruction comprises:
  generating a state event;
  sending, by the embedded controller, the state event to an operating system;
  generating, by the operating system, a control instruction based on the state event and sending the generated control instruction to the embedded controller; and
  switching, by the embedded controller, the operating state of the device,
or
  generating an control instruction; and
  switching, directly by the embedded controller, the operating state of the device.

A computer comprising a display portion and a host portion is provided, which further comprises:
  a detection unit adapted to detect whether the display portion and the host portion of the computer are in a disconnected state, and to notify a controller unit that the display portion and the host portion of the computer are in a disconnected state, when the disconnected state is detected; and
  the controller unit adapted to generate a state event or a control instruction corresponding to the disconnected state, said state event or control instruction being for switching a device of the computer to an inactive state.

In the above computer, the device is a graphic adapter or an input device.

In the above computer, the controller unit comprises:
  a first controller unit adapted to generate a state event or a control instruction containing information indicating that the operating state into which the graphic adapter is to be switched is an inactive state or that the operating state into which the input device is to be switched is an input locked state, when a notification received from the detection unit indicates that the display portion and the host portion of the computer are disconnected from each other; and
  a second controller unit adapted to generate a state event or a control instruction containing information indicating that the operating state into which the graphic adapter is to be switched is an active state or that the operating state in to which the input device is to be switched is an input unlocked state, when a notification received from the detection unit indicates that the display portion and the host portion of the computer are connected with each other.

In the above computer, the controller unit is an embedded controller within the computer.

The above computer further comprises:
  an operating system unit adapted to generate, upon receipt of the state event from the controller unit, the control instruction, and to send the generated control instruction to the controller unit for switching the operating state of the device.

In the above computer, the host portion has a first interface and the display portion has a second interface. The display portion and the host portion interface with each other and communicate data with each other via the first interface and the second interface.

In the above computer, the host portion is capable of operating as a standalone device, and a master operating system runs on a first hardware system within the host portion. The display portion is capable of operating as a standalone device, and a slave operating system runs on a second hardware system within the display portion, the slave operating system being an embedded operating system.

With the present invention, when the state of a computer changes, e.g., when a display portion and a host portion of a portable computer are detached from each other, an operating system can control a device to switch its operating state, e.g., deactivate the device, based on a generated state event. In this way, it is possible to avoid unnecessary power consumption of the entire computer due to the active state of the device, and the security risk can also be eliminated.

DETAILED DESCRIPTION OF PREFERRED EMBODIMENTS

In the following, the present invention will be described in detail with reference to the embodiments and figures, such that the problem to be solved, the solutions and the advantages of the present invention will be more apparent.

Figure 1:
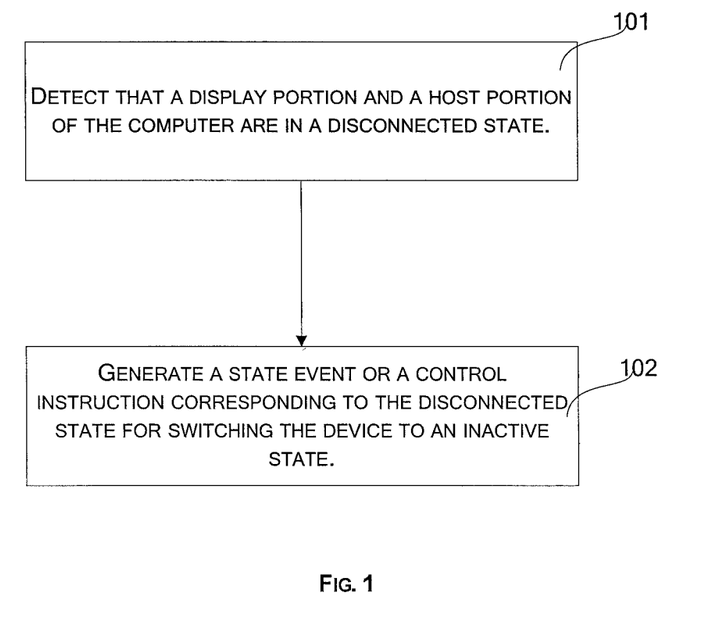
FIG. 1 is a flowchart illustrating the method for controlling operating state of a device of a computer according to an embodiment of the present invention.

According to an embodiment of the present invention, a method for controlling operating state of a device of a computer comprises the steps as shown in FIG. 1.

At step 101, it is detected that a display portion and a host portion of the computer are in a predetermined state.

At step 102, a state event or a control instruction corresponding to the predetermined state is generated for switching the operating state of the corresponding device.

With the present invention, when the state of a computer changes, e.g., when a display portion and a host portion of a portable computer are separated or disconnected, an operating system can control an associated device to switch its operating state, e.g., deactivate the device, based on a generated state event. In this way, it is possible to avoid unnecessary power consumption of the entire computer due to the active state of the device, and some potential security risk can also be eliminated.

Figure 2:
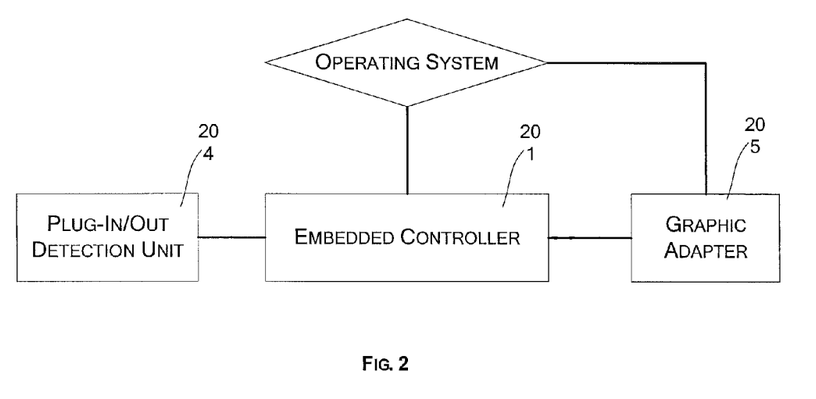
FIG. 2 is a schematic diagram showing a configuration for controlling power supply to a graphic adapter according to an embodiment of the present invention.

According to an embodiment of the present invention, in a portable computer for example, the display portion and the host portion comprising a graphic adapter 205 can be separated or detached from each other. After the separation of the display portion and the host portion, the host portion is not powered off and thus the graphic adapter is still operating actively, though nothing is output. This leads to waste of the power. Thus, the graphic adapter 205 should be deactivated. In this regard, as shown in FIG. 2, a plug-in/out detection unit 204 is included for detecting a disconnected state between the display portion and the host portion.

The graphic adapter 205 is connected with an embedded controller (EC) 201, which is in turn connected to an operating system (OS).

Figure 3:
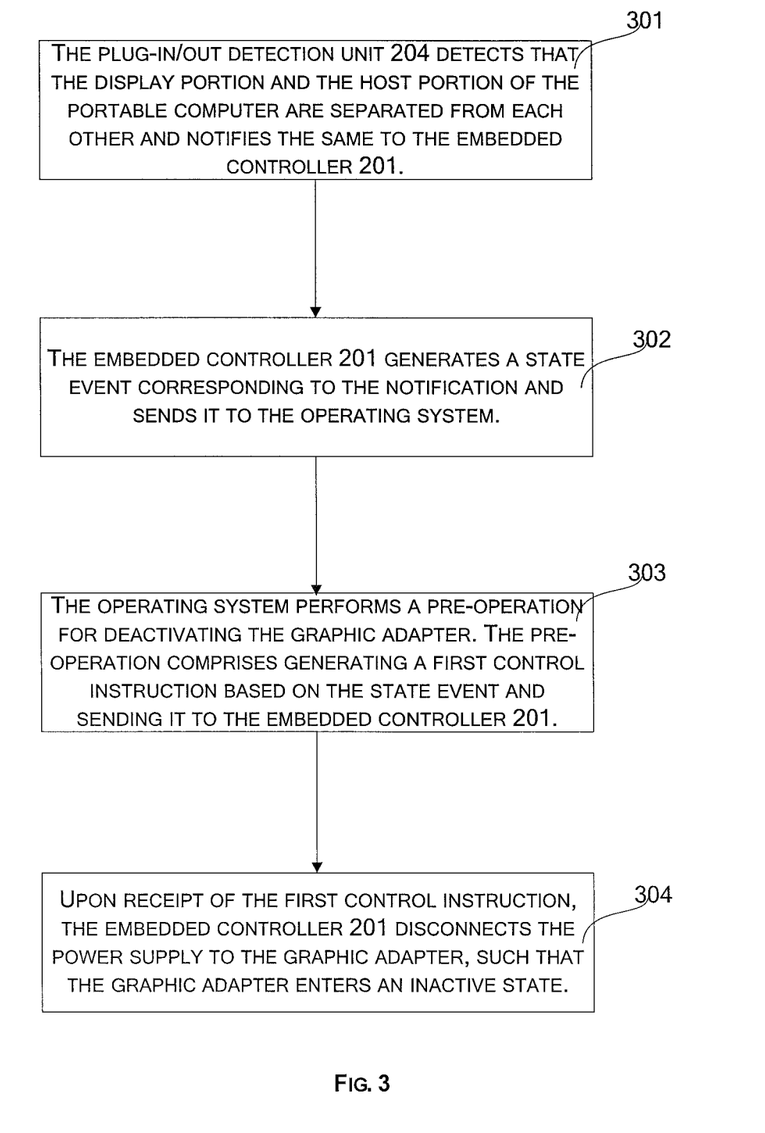
FIG. 3 is a flowchart illustrating a process for controlling power supply to a graphic adapter according to an embodiment of the present invention.

As shown in FIG. 3, the following process is further included.

At step 301, the plug-in/out detection unit 204 detects that the display portion and the host portion of the portable computer are separated from each other and notifies the same to the embedded controller 201.

At step 302, the embedded controller 201 generates a state event corresponding to the notification and sends it to the operating system.

At step 303, the operating system performs a pre-operation for deactivating the graphic adapter 205. The pre-operation comprises generating a first control instruction based on the state event and sending it to the embedded controller 201.

Herein, there are two possibilities for deactivation of the function of the graphic adapter 205:

(1) The power supply to the graphic adapter 205 is not switched off. The operating system sets the graphic adapter 205 to an inactive mode or a low power consumption mode. In this case, the plug-in/out detection unit 204 only needs to report when the plug-in/out is performed to the OS.

(2) The power supply to the graphic adapter 205 is switched off. However, this is not supported by any operating system. For example, in the Windows system, direct deactivation of the graphic adapter 205 may lead to shutdown of the system. When determining the received state event as a plug-out event, the operating system first performs a pre-operation for deactivating the graphic adapter 205 and then notifies the embedded control 201 to switch off the power supply to the graphic adapter 205. When the display portion is plugged into the host portion, the graphic adapter is powered up via the embedded controller 201. Then, upon determining the received state event as a plug-in event, the operating system initializes the graphic adapter 205 such that the latter can resume its operation.

At step 304, upon receipt of the first control instruction, the embedded controller 201 switches off the power supply to the graphic adapter 205, and the graphic adapter 205 enters an inactive state.

On the other hand, the plug-in/out detection unit 204 can detect a connection action, in addition to detection of a disconnection action. A General-Purpose Input/Output (GPIO) pin of the embedded controller 201 is connected to a plug-in/out interface. In this case, the GPIO and the plug-in/out interface constitute the plug-in/out detection unit 204. The embedded controller 201 can capture a change in the power level at the GPIO pin caused by the plug-in/out action. In particular, the embedded controller 201 detects the change in the level at the GPIO pin and outputs an interrupt signal to the operating system, which can be an interrupt of SMI or SCI type. Upon receipt of the interrupt signal, the operating system reads the state event sent from the embedded controller 201 and makes determination.

Figure 7:
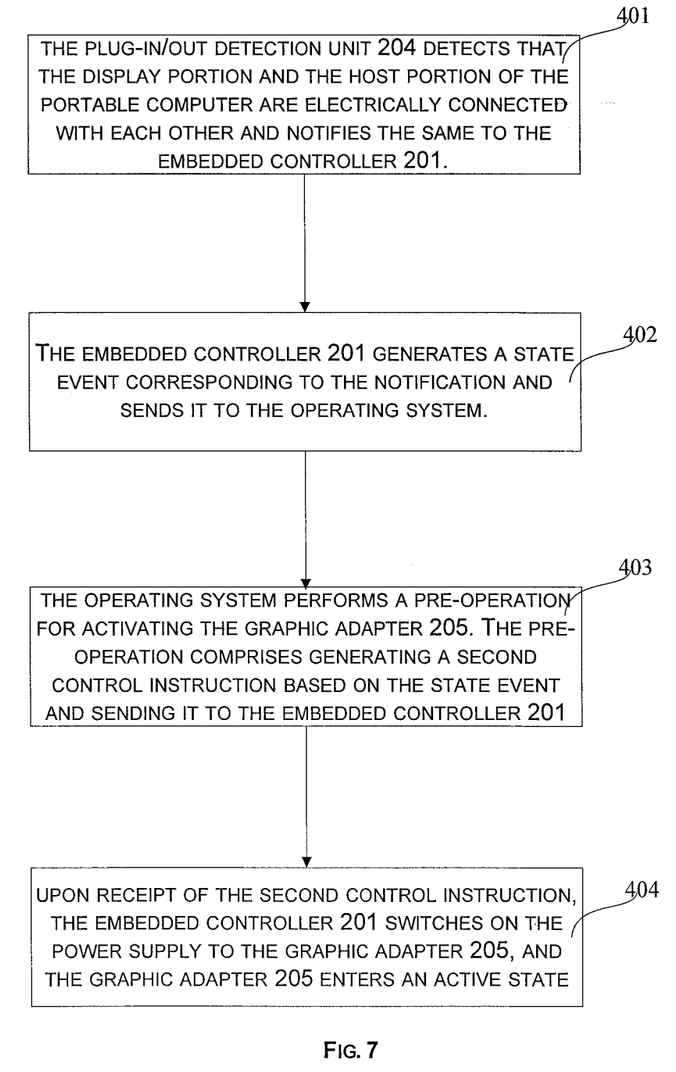
FIG. 7 is a flowchart illustrating a process for controlling power supply to a graphic adapter according to another embodiment of the present invention.

FIG. 7 is a flowchart illustrating a process for controlling power supply to a graphic adapter according to another embodiment of the present invention.

At step 401, the plug-in/out detection unit 204 detects that the display portion and the host portion of the portable computer are electrically connected with each other and notifies the same to the embedded controller 201.

At step 402, the embedded controller 201 generates a state event corresponding to the notification and sends it to the operating system.

At step 403, the operating system performs a pre-operation for activating the graphic adapter 205. The pre-operation comprises generating a second control instruction based on the state event and sending it to the embedded controller 201.

At step 404, upon receipt of the second control instruction, the embedded controller 201 switches on the power supply to the graphic adapter 205, and the graphic adapter 205 enters an active state.

It is to be noted that, in addition to deactivate the display function of the graphic adapter 205, the embodiment of the present invention can control other devices.

Figure 4:
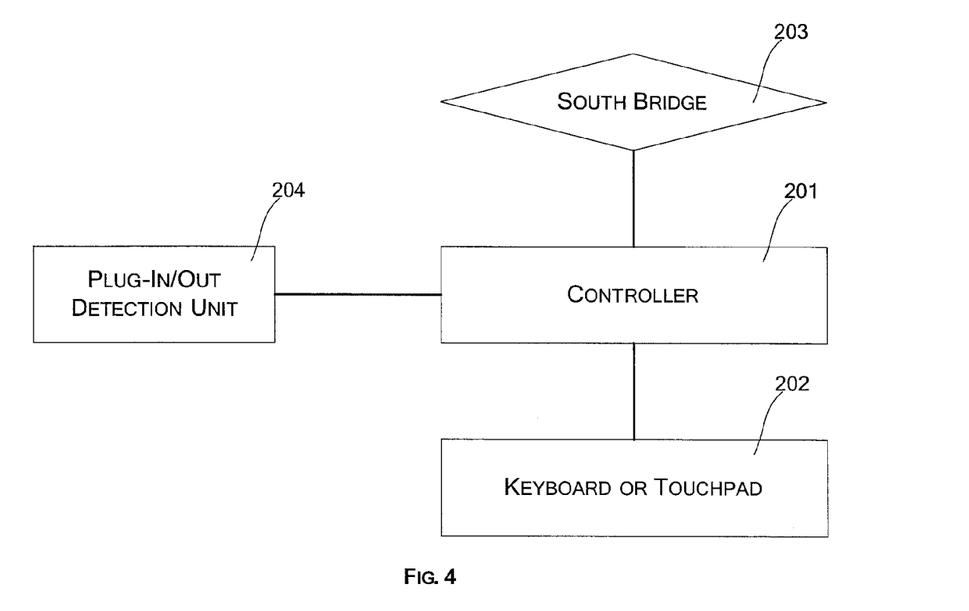
FIG. 4 is a schematic diagram showing a configuration for controlling the state of an input device according to an embodiment of the present invention.
Figure 8:
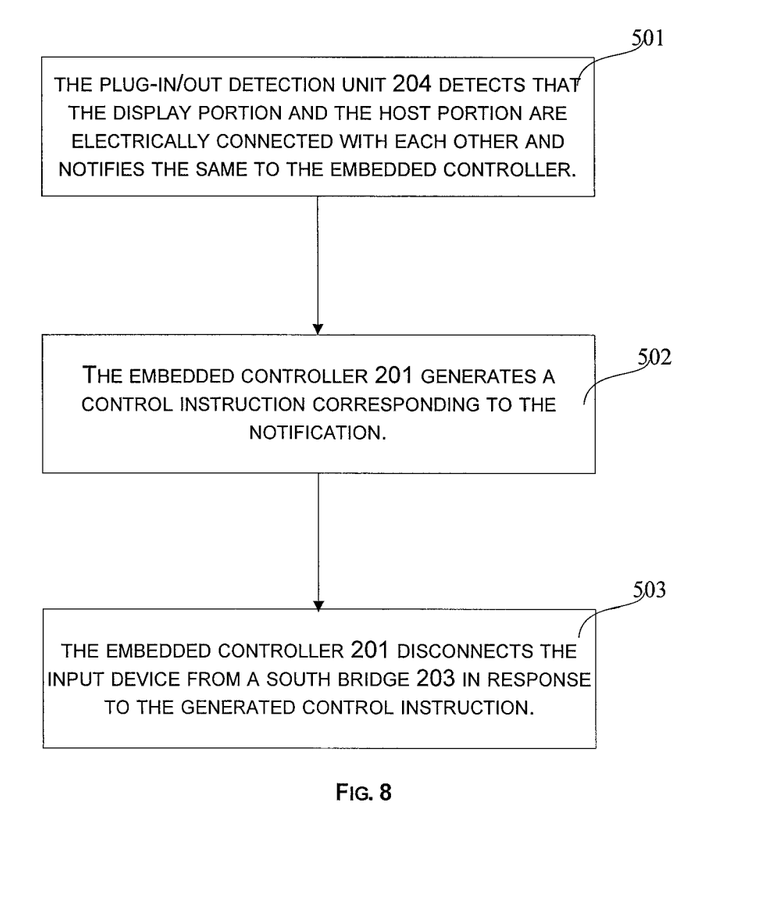
FIG. 8 is a flowchart illustrating a process for controlling the state of an input device according to an embodiment of the present invention.

Again, the example of the portable computer is assumed. When the display portion and the host portion are separated or disconnected, the result of an input operation is invisible, and thus some erroneous keyboard operation may cause modification or deletion of important files. Thus, it is necessary to deactivate the operation of the keyboard immediately in response to detection of the separating action, as shown in FIG. 4. In particular, the process as shown in FIG. 8 comprises the following steps.

At step 501, the plug-in/out detection unit 204 detects that the display portion and the host portion of the portable computer are separated or disconnected from each other and notifies the same to the embedded controller 201.

At step 502, the embedded controller 201 generates a control instruction corresponding to the notification.

At step 503, in response to the generated control instruction, the embedded controller 201 disconnects the input device from a south bridge 203. In a computer, a keyboard or a touchpad 202 as the input device is typically connected to the south bridge of the main board through the embedded controller 201. As such, the embedded controller 201 can deactivate the input from the keyboard or the touchpad 202 autonomously, instead of through the operating system. Herein, the input device can comprise a keyboard, a touchpad, a special function key, or a USB-extended mouse/keyboard, etc.

Figure 5:
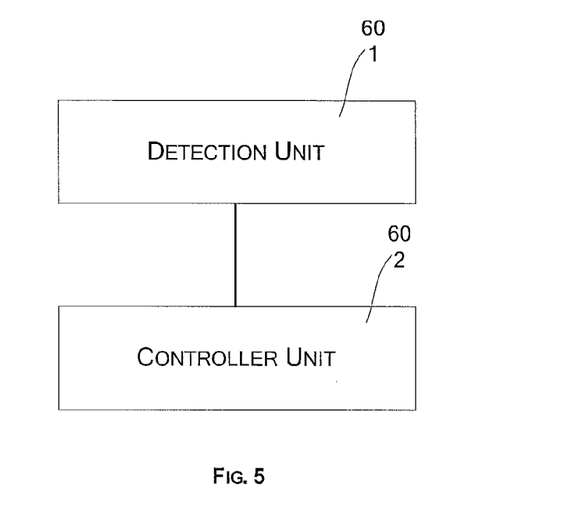
FIG. 5 is a schematic block diagram of the computer according to an embodiment of the present invention.

As shown in FIG. 5, in correspondence with the above method, a computer is also provided, which comprises:
  a detection unit 601 adapted to detect that a display portion and a host portion of the computer are in a disconnected state and notify the same to a controller unit; and
  the controller unit 602 adapted to generate a state event or a control instruction corresponding to the disconnected state for switching a device to an inactive state.

With the present invention, when the state of a computer changes, e.g., when a display portion and a host portion of a portable computer are separated, an operating system can control an associated device to switch its operating state, e.g., deactivate the device, based on a generated state event. In this way, it is possible to avoid unnecessary power consumption of the entire computer due to the active state of the device, and any potential security risk can be eliminated.

The device of the computer can be a graphic adapter or an input device.

The controller unit 602 can comprise:
  a first controller unit adapted to generate a state event or a control instruction containing information indicating that the operating state into which the graphic adapter 205 is to be switched is an inactive state or that the operating state into which the input device is to be switched is an input locked state, when a notification received from the detection unit 601 indicates that the display portion and the host portion of the computer are disconnected from each other; and
  a second controller unit adapted to generate a state event or a control instruction containing information indicating that the operating state into which the graphic adapter 205 is to be switched is an active state or that the operating state into which the input device is to be switched is an input unlocked state, when a notification received from the detection unit 601 indicates that the display portion and the host portion of the computer are connected with each other.

In particular, the controller unit 602 is an embedded controller 201 within the computer.

The computer can further comprise an operating system unit adapted to generate, upon receipt of the state event from the controller unit 602, the control instruction, and to send the generated control instruction to the controller unit 602 for switching the operating state of the device.

Figure 6:
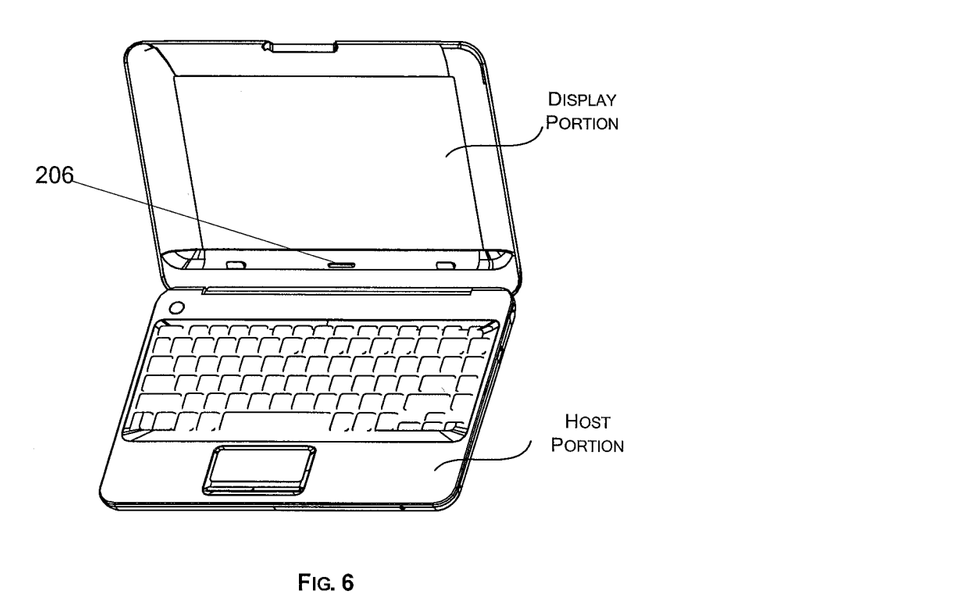
FIG. 6 is a schematic block diagram of a notebook computer having hybrid architecture according to an embodiment of the present invention.

In particular, as shown in FIG. 6, the portable computer can be a notebook computer having hybrid architecture. The master unit of the notebook computer is a host portion comprising a keyboard. The slave unit of the notebook computer is a display portion comprising a display screen. A master operating system is running on a first hardware system (having an X86 architecture) within the host portion and may be typically a Windows system. The host portion can function as a standalone device, such as a home server for executing a download task. Alternatively, the host portion can be connected to a common display device to form a common computer. A slave operating system is running on a second hardware system (ARM) within the display portion and may be typically an embedded operating system such as winCE. The display portion can function as a standalone device. The display portion may further have a touch function and can thus be used as a tablet touch computers. Since a first interface 206 is provided in the host portion, a second interface (not shown) can be correspondingly provided in the display portion. In this way, a notebook computer having hybrid architecture can be formed by interfacing the first interface 206 and the second interface, such that the host portion and the display portion can cooperate with each other. Data (including information on system states) can be transmitted and circuitries can be connected via the interfaced first interface 206 and the second interface. Thus, the master device and the slave device constitute a portable terminal having hybrid architecture in a notebook form.

The embodiments of the present invention have the following advantageous effects. With the present invention, when the state of a computer changes, e.g., when a display portion and a host portion of a portable computer are separated, an operating system can control an associated device to switch its operating state, e.g., deactivate the device, based on a generated state event. In this way, it is possible to avoid unnecessary power consumption of the entire computer due to the active state of the device. As the input device is deactivated after the display portion is removed, it is possible to eliminate any potential security risk that the operating system or important documents may be damaged.

It should be noted that the above embodiments are only intended to explain, rather than limiting, the solutions of the present invention. Depending on actual implementation, the values of all the parameters involved can be adjusted, which falls within the scope of the present invention. Further, various modifications and equivalent alternatives can be made by those skilled in the art without departing from the spirit and scope of the present invention. All these modifications and equivalent alternatives are encompassed by the scope of the present invention.

What is claimed is:

1. A method for controlling operating state of a device in a computer comprising a display portion and a host portion, the method comprising:
   detecting that the display portion and the host portion are disconnected from each other;
   generating, by an embedded controller within the computer, a state event or a control instruction in response to the detected disconnection, wherein the state event or control instruction is configured for switching the device into an inactive state;
   performing in response to the generated state event or control instruction, by the operating system of the computer, a pre-operation required for switching the device into the inactive state without causing a failure in the computer; and
   switching, by the embedded controller, the device into the inactive state in response to the pre-operation performed by the operating system.

2. The method according to claim 1, wherein,
   the device is an input device;
   the switched-into operating state of the input device is an input locked state, when the display portion and the host portion of the computer are disconnected;
   the switched-into operating state of the input device is an input unlocked state, when the display portion and the host portion of the computer are connected.

3. The method according to claim 1, wherein
   the device is a graphic adapter;
   the switched-into operating state of the graphic adapter is an inactive state, when the display portion and the host portion of the computer are disconnected;
   the switched-into operating state of the graphic adapter is an active state, when the display portion and the host portion of the computer are connected.

4. The method according to claim 1, wherein the step of performing by the operating system the pre-operation further comprises:
   receiving, by the operating system, the generated state event or control instruction sent from the embedded controller;
   performs, by the operating system, the pre-operation;
   generating, by the operating system, an instruction for instructing the embedded controller to switch the device into the inactive state, and sending the instruction to the embedded controller;
   wherein the embedded controller performs the switching in response to the instruction.

5. A computer comprising a display portion and a host portion, further comprising:
   a detection unit, configured to detect whether the display portion and the host portion of the computer are disconnected from each other, and to notify a controller unit that the display portion and the host portion of the computer are in a disconnected state when the disconnection is detected; and
   a controller unit, configured to generate a state event or a control instruction corresponding to the disconnected state, wherein the state event or control instruction is configured for switching a device in the computer to an inactive state;
   wherein an operating system of the computer is configured to perform, in response to the generated state event or control instruction, a pre-operation required for switching the device into the inactive state without causing a failure in the computer; and
   the controller unit is further configured to switch the device into the inactive state in response to the pre-operation performed by the operating system.

6. The computer according to claim 5, wherein
   the device is an input device, and
   the controller unit comprises:
      a first controller unit adapted to generate a state event or a control instruction containing information indicating that the operating state into which the input device is to be switched is an input locked state when a notification received from the detection unit indicates that the display portion and the host portion of the computer are disconnected from each other; and
      a second controller unit adapted to generate a state event or a control instruction containing information indicating that the operating state into which the input device is to be switched is an input unlocked state when a notification received from the detection unit indicates that the display portion and the host portion of the computer are connected with each other.

7. The computer according claim 5, wherein
   the device is a graphic adapter, and
   the controller unit comprises:
      a first controller unit adapted to generate a state event or a control instruction containing information indicating that the operating state into which the graphic adapter is to be switched is an inactive state when a notification received from the detection unit indicates that the display portion and the host portion of the computer are disconnected from each other; and
      a second controller unit adapted to generate a state event or a control instruction containing information indicating that the operating state into which the graphic adapter is to be switched is an active state when a notification received from the detection unit indicates that the display portion and the host portion of the computer are connected with each other.

8. The computer according to claim 5, wherein the controller unit is an embedded controller within the computer.

9. The computer according to claim 5, wherein
   the operating system receives the generated state event or control instruction sent from the controller unit, performs the pre-operation, generates an instruction for instructing the controller unit to switch the device into the inactive state, and sends the instruction to the controller unit;
   wherein the controller unit switches the device into the inactive state in response to the instruction.

10. The computer according to claim 5, wherein the host portion has a first interface and the display portion has a second interface; and
   the display portion and the host portion interface with each other and communicate data with each other via the first interface and the second interface.

11. The computer according to claim 5, wherein
the host portion is capable of operating as a standalone device, and a master operating system runs on a first hardware system within the host portion; and
the display portion is capable of operating as a standalone device, and a slave operating system runs on a second hardware system within the display portion, the slave operating system being an embedded operating system.

\* \* \* \* \*